(12) United States Patent
Yajima (10) Patent No.: US 12,332,467 B2
(45) Date of Patent: Jun. 17, 2025

(54) DIFFRACTIVE OPTICAL MEMBER AND VIRTUAL IMAGE DISPLAY DEVICE

(71) Applicant: SEIKO EPSON CORPORATION, Tokyo (JP)

(72) Inventor: Hideaki Yajima, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 579 days.

(21) Appl. No.: 17/826,899

(22) Filed: May 27, 2022

(65) Prior Publication Data

US 2022/0381966 A1     Dec. 1, 2022

(30) Foreign Application Priority Data

May 28, 2021   (JP) ................. 2021-090161

(51) Int. Cl.
*G02B 5/32* (2006.01)
*G02B 27/01* (2006.01)

(52) U.S. Cl.
CPC ........... *G02B 5/32* (2013.01); *G02B 27/0172* (2013.01); *G02B 2027/0105* (2013.01); *G02B 2027/0174* (2013.01)

(58) Field of Classification Search
None
See application file for complete search history.

(56) References Cited

U.S. PATENT DOCUMENTS

2019/0265483 A1    8/2019  Tatsugi et al.
2022/0099871 A1*   3/2022  Fujii ................... G02B 5/1814

FOREIGN PATENT DOCUMENTS

JP        2019-148738 A    9/2019

\* cited by examiner

*Primary Examiner* — Richard H Kim
(74) *Attorney, Agent, or Firm* — Oliff PLC (57) ABSTRACT

A diffractive optical member includes a hologram element, a support member that supports the hologram element by contacting the hologram element from one side, and a covering film member that is a first film member and covers the hologram element by contacting the hologram element from a side opposite to the one side. The covering film member includes a coupling portion that is in contact with the support member, and the coupling portion is separated from the hologram element.

14 Claims, 8 Drawing Sheets

DIFFRACTIVE OPTICAL MEMBER AND VIRTUAL IMAGE DISPLAY DEVICE

The present application is based on, and claims priority from JP Application Serial Number 2021-090161, filed May 28, 2021, the disclosure of which is hereby incorporated by reference herein in its entirety.

BACKGROUND

1. Technical Field

The present disclosure relates to a diffractive optical member that can be applied to light guiding in a virtual image display device that presents a virtual image to an observer, and to a virtual image display device provided with the diffractive optical member.

2. Related Art

As a diffractive optical member that can be applied to a virtual image display device, a diffractive optical member is disclosed in which a dielectric film is disposed around a hologram element to prevent infiltration of moisture from the outside (JP-A-2019-148738).

However, in the above-described technology, depending on the material to be used, manufacturing conditions, and the like, there is a risk that the moisture may infiltrate into the hologram element at an interface of a member formed by a dielectric film or the like and covering the hologram, for example, due to capillary action, or the like.

SUMMARY

A diffractive optical member according to an aspect of the present disclosure includes a hologram element, a support member that supports the hologram element by contacting the hologram element from one side, and a first film member that covers the hologram element by contacting the hologram element from a side opposite to the one side. The first film member includes a coupling portion in contact with the support member, and the coupling portion is separated from the hologram element.

DESCRIPTION OF EXEMPLARY EMBODIMENTS

First Embodiment

Figure 1:
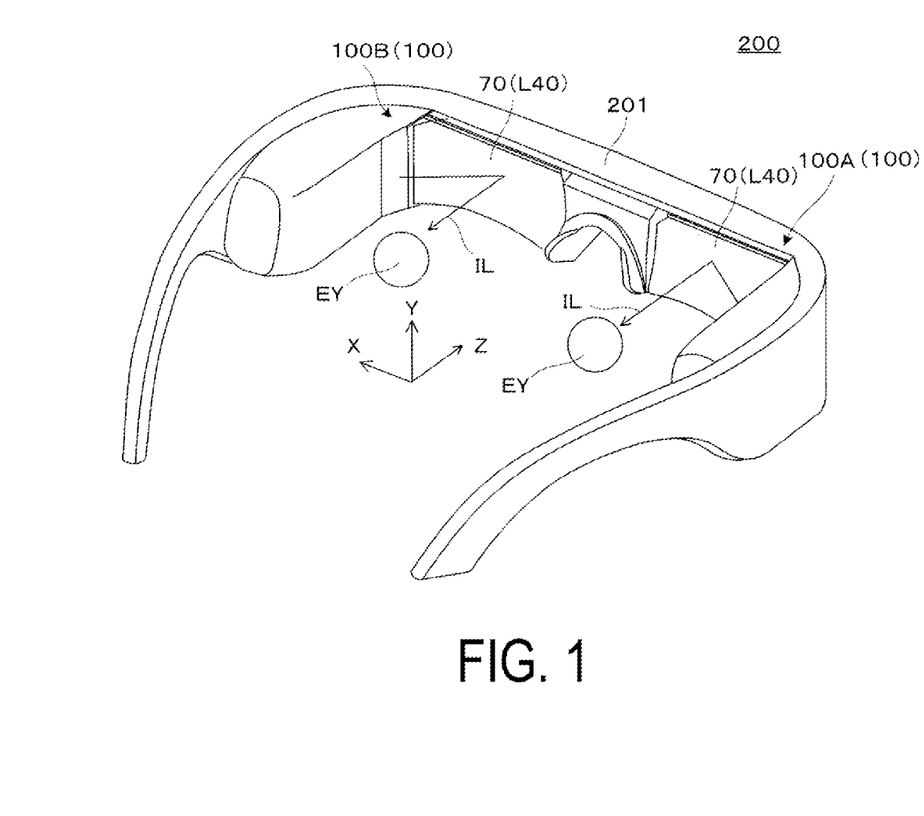
FIG. 1 is a perspective view illustrating an external appearance of a head-mounted display including a diffractive optical member according to a first embodiment.

With reference to FIG. 1 and the like, a configuration example of a head-mounted display will be described below. The head-mounted display is an example of a diffractive optical member according to a first embodiment and a virtual image display device including the diffractive optical member.

Figure 2:
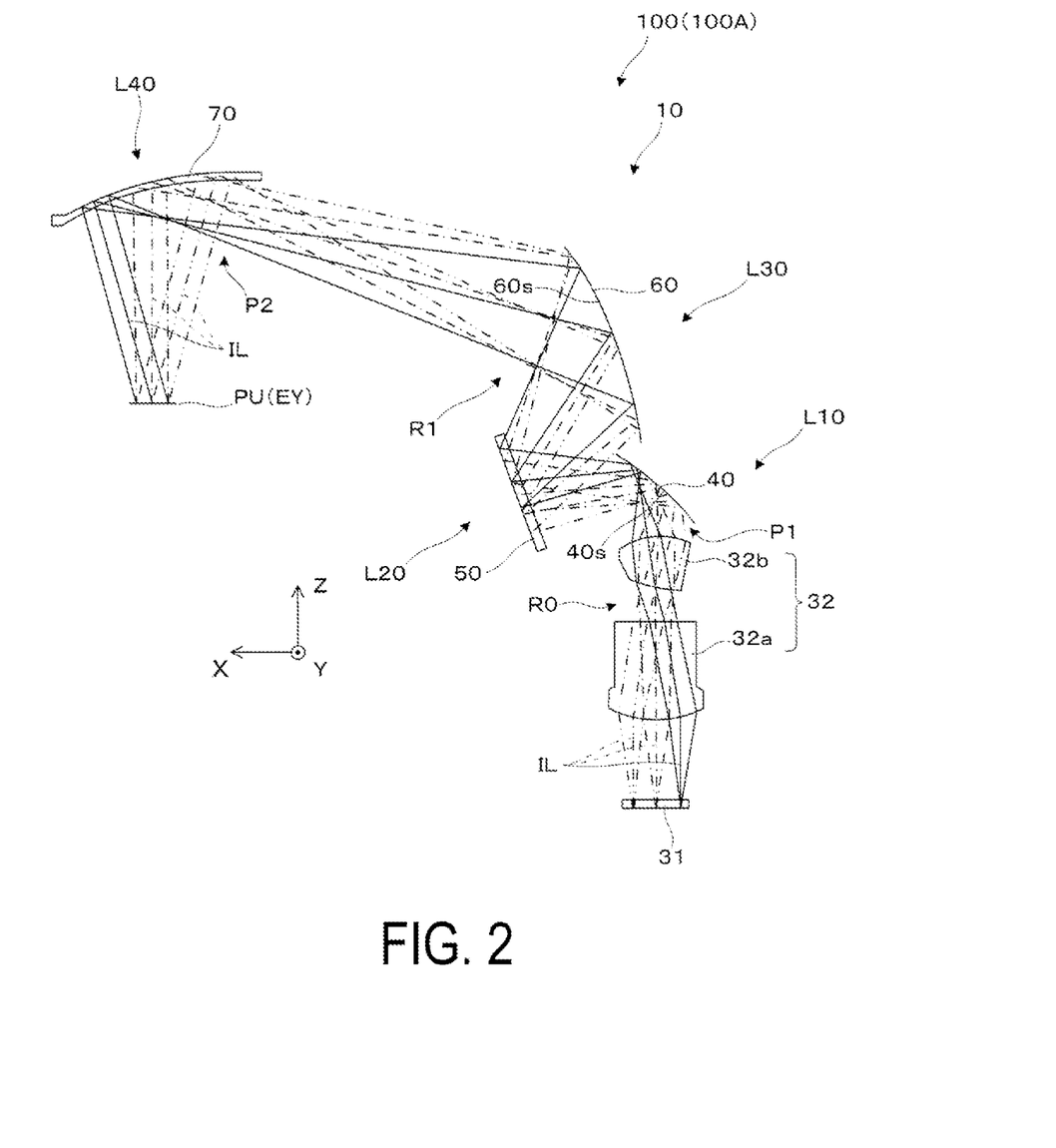
FIG. 2 is a ray diagram of an optical system of the head-mounted display.
Figure 3:
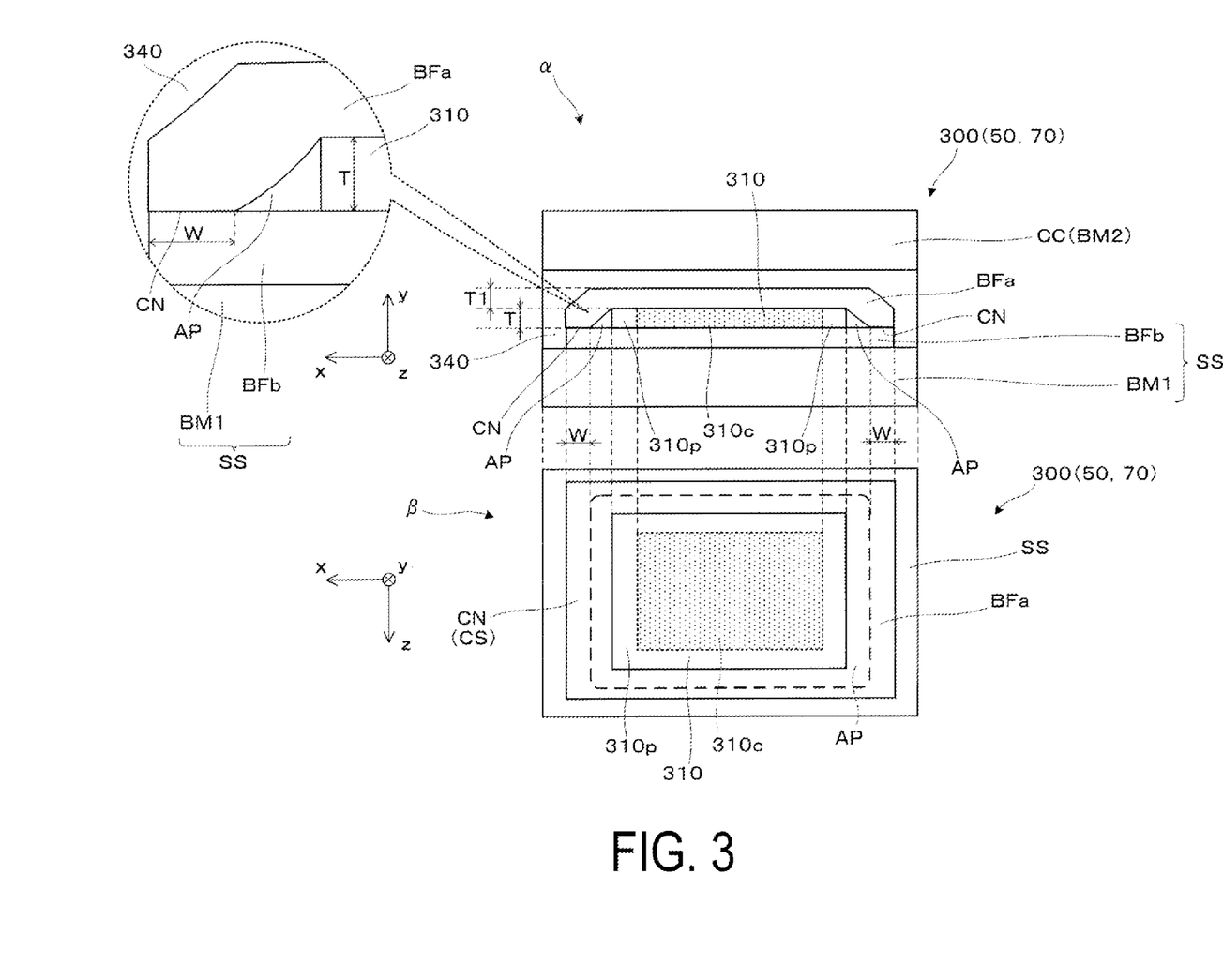
FIG. 3 is a schematic diagram of the diffractive optical member.

FIG. 1 is a perspective view illustrating a mode of an external appearance of a head-mounted display (hereinafter referred to as an "HMD") 200 including a display device 100, as the virtual image display device according to this embodiment, namely, illustrating an external appearance of a head-mounted display device. Further, FIG. 2 is a ray diagram of an optical system 10 of the display apparatus 100. Furthermore, FIG. 3 is a schematic vertical cross-sectional view and a front view of a structure of a diffractive optical member 300, which is applied as each of diffractive optical members 50 and 70 (see FIG. 2) that constitute the optical system 10 of the display device 100. Note that, for example, in FIG. 3 and the like, in order to illustrate each layer and each member of each portion constituting the diffractive optical member 300 in a recognizable size, the thickness and the thickness ratio, and the like of each of the layers and each of the members are illustrated differently from those of the actual layers and members. Further, in an example illustrated in FIG. 3 and the like, the diffractive optical member 300 is illustrated as having a flat plate shape, but like the second diffractive optical member 70 illustrated in FIG. 2, the diffractive optical member 300 may have a curved surface shape (see FIG. 5).

As illustrated in FIG. 1, the HMD 200 includes a display device 100A for the right eye, a display device 100B for the left eye, and a frame 201 that supports the display devices 100A and 100B. Each of the display devices 100A and 100B is a see-through type virtual image display device that generates imaging light IL, guides the generated imaging light IL to the front of right and left eyes EY of an observer or a wearer, and causes the imaging light IL to be observable in a state in which the imaging light IL is superimposed with an external world image. As a result, an augmented reality (AR) display can be achieved that superimposes and adds virtual visual information, such as an image or data, onto the external world view or a target object.

Note that, of the HMD 200, a structure and the like of the second diffractive optical member 70 will be described in detail below. The second diffractive optical member 70 is a fourth optical unit L40 disposed in front of the eye EY to extract the imaging light IL.

In FIG. 1 and the like, X, Y, and Z are an orthogonal coordinate system, a positive X direction corresponds to a transverse direction in which the two eyes EY of the observer or a wearer US who is wearing the HMD 200 including the display devices 100 are disposed side by side, a positive Y direction corresponds to an upward direction orthogonal to the transverse direction in which the two eyes EY of the wearer US are disposed side by side, and a positive Z direction corresponds to a direction to the front or a forward direction when viewed by the wearer US. In FIG. 1, although the display device 100B for the left eye is also illustrated as well as the display device 100A for the right eye, since the display device 100A for the right eye and the display device 100B for the left eye are optically inverted left and right, hereinafter, the display device 100A for the right eye will be described as the representative display device 100. For example, in FIG. 2, the ray diagram of the optical system 10 is illustrated with respect to the display device 100A for the right eye.

A configuration example of the optical system 10 of the display device 100 will be described below with reference to the ray diagram illustrated as FIG. 2.

In the example illustrated in FIG. 2, the optical system 10 of the display device 100 includes an imaging light generating device 31, a projection optical system 32, a first mirror 40, and the first diffractive optical member 50, which is a reflection-type diffractive element, and the second diffractive optical member 70, which is a reflection-type diffractive element, in this order from a light source side.

Of the optical system 10, the imaging light generating device 31 includes a light source, and generates the imaging light IL. As the imaging light generation device 31, a display panel such as an organic EL display element, or the like can be employed, for example. In this case, the display device 100 can be provided that is compact and capable of displaying a high-quality image. Further, a mode may be adopted in which the imaging light generating device 31 includes an illumination light source (not illustrated), and a display panel, such as a liquid crystal display element, that modulates illumination light emitted from the illumination light source. Furthermore, a mode may be adopted in which the imaging light generating device 31 modulates laser light using a micro-mirror device. Note that in the example illustrated in FIG. 2, a mode is adopted in which the imaging light generating device 31 includes a single display panel capable of color display, but the imaging light generating device 31 may be constituted by a plurality of the display panels corresponding to each color and a synthesis optical system that synthesizes imaging light of each of the colors emitted by the plurality of display panels.

Of the optical system 10, the projection optical system 32 includes a rotationally symmetric lens 32a and a lens 32b having a free form surface, and projects the imaging light IL emitted from the imaging light generating device 31 toward a latter stage of an optical path.

The first mirror 40 includes a reflective surface 40s having a recessed curved shape, and has a positive power. The first mirror 40 is disposed at a partway position in the optical path extending from the projection optical system 32 up to the first diffractive member 50. The projection optical system 32 forms a first intermediate image P1 at or in the vicinity of the reflective surface 40s of the first mirror 40. Note that the first mirror 40 may be considered as a constituent element of the projection optical system 32.

The second mirror 60 has a reflective surface 60s having a recessed curved shape, and has a positive power. The reflective surface 60s may be a spherical, non-spherical, or free form surface, and here, it is assumed that the reflective surface 60s is the free form surface. The second mirror 60 reflects the imaging light IL diffracted by the first diffractive optical member 50 toward the second diffractive optical member 70. Note that a second intermediate image P2 of the imaging light IL is formed between the second mirror 60 and the second diffractive optical system 70.

The first diffractive optical member 50 and the second diffractive optical member 70 are each constituted by a reflection-type volume holographic element. Of these, the second diffractive optical member 70 has a recessed curved surface and has a positive power. In this embodiment, by providing a structure for sealing the hologram element in the first diffractive optical member 50 and the second diffractive optical member 70, a diffracted state is maintained to be in a desired state, and image formation in the display device 100 is favorably maintained. Note that the structure of the first diffractive optical member 50 or the second diffractive optical member 70 will be described in detail below with reference to FIG. 3 and the like.

Note that, in the above-described mode, of the optical system 10, the configuration excluding the imaging light generating device 31 can also be considered as being constituted by a first optical unit L10 that is constituted by the projection optical system 32 and the first mirror 40, and a second optical unit L20 that is constituted by the reflection-type first diffractive optical member 50, a third optical unit L30 that is constituted by the second mirror 60, and the fourth optical unit L40 that is constituted by the reflection-type second diffractive optical member 70. In an example described here, the second intermediate image P2 of the imaging light IL is formed between the third optical unit L30 and the fourth optical unit L40, namely, between the second mirror 60 and the second diffractive optical member 70, and further, the fourth optical unit L40 (the second diffractive optical member 70) collimates the imaging light IL and forms an exit pupil PU. The exit pupil PU is a position that is assumed to be the position of the eye EY of the observer.

Based on the above-described configuration of the optical system 10, more specifically, the optical path of the imaging light IL can be described as below. First, the imaging light generating device 31 emits the imaging light IL toward the first optical unit L10 that is constituted by the projection optical system 32 and the like. Subsequently, the first optical unit L10 emits the imaging light IL incident on the projection optical system 32 toward the second optical unit L20 that is constituted by the first diffractive optical member 50. Note that an exit pupil R0 is formed between the rotationally symmetric lens 32a and the lens 32b having the free form surface, which constitute the projection optical system 32, and the first intermediate image P1 is formed at or in the vicinity of the reflective surface 40s of the first mirror 40. Further, the reflection-type first diffractive optical member 50 emits the incident imaging light IL toward the third optical unit L30 that is a light guiding system and is constituted by the second mirror 60. In other words, the first diffractive optical member 50 bends the optical path of the imaging light IL using a diffraction effect. The second mirror 60 emits the incident imaging light IL toward the fourth optical unit L40 that is constituted by the second diffractive optical member 70, using the reflective surface 60s. The second diffractive optical member 70 collimates the incident imaging light IL, emits it toward the eye EY of the observer, and forms the exit pupil PU. In other words, as a result of the eye EY of the observer being at the position of the exit pupil PU according to the above-described configuration, each ray of light constituting the imaging light IL is formed as a single dot of an image in the retina of the eye EY, and thus, a virtual image generated by the imaging light IL can be made visible. Note that an exit pupil R1 is formed between the second mirror 60 and the second diffractive optical member 70.

With reference to FIG. 3, an example of the structure of the first diffractive optical member 50 or the second diffractive optical member 70 will be described below. In FIG. 3, the vertical cross-sectional view schematically illustrated as a state α and the front view schematically illustrated as a state β conceptually illustrate an example of the diffractive optical member 300 having a structure that can be applied as the first diffractive optical member 50 or the second diffractive optical member 70. Note that, in FIG. 3, the state α is, in other words, a state viewed from the normal direction of a cross section taken across each of portions that are layered to constitute the diffractive optical member 300. Further, as illustrated in FIG. 3, the horizontal direction in which each of the layers extends in the cross-sectional view is referred to as a positive and a negative x direction, the vertical direction in which each of the layers is layered on top of each other is referred to as a positive and a negative y direction, and the above-described normal direction is referred to as a positive and a negative z direction. Of these, the negative y side is a lower side, and the positive y side is an upper side. Further, in order to make it easier to understand the structure, the dimensions (the thickness, for example) of each of the portions are depicted in an exaggerated manner, namely, exaggerating the actual dimensions.

As illustrated in the state α, the diffractive optical member 300 according to this embodiment is constituted by layering a plurality of members in the positive y direction. Specifically, the diffractive optical member 300 includes a hologram element 310, a support member SS that supports the hologram element 310, a covering film member BFa that covers the hologram element 310, a covering member CC that covers the covering film member BFa, and an adhesive layer 340 that is constituted by an adhesive member that adheres the covering film member BFa and the covering member CC to each other. Here, the covering film member BFa is also referred to as a first film member.

The hologram element 310 is, for example, a plate-shaped member having a thickness T of approximately 80 μm, and in a central portion (central region) 310c thereof, a volume hologram is provided as a result of interference fringes being formed therein by interference exposure being performed, using object light and reference light, with respect to a holographic photosensitive layer having a sensitivity corresponding to a predetermined wavelength. In other words, the hologram element 310 functions as a hologram that performs diffraction by deflecting light incident on the central portion 310c. Note that in FIG. 3, the central portion 310c is illustrated by hatching, and a peripheral portion (edge region) 310p, which is illustrated without hatching, is formed around the central portion 310c. The peripheral portion 310p does not exhibit any diffraction effect unlike the central portion 310c, and, for example, the peripheral portion 310p has high optical transparency and transmits visible light such as the imaging light or the external light. In other words, the interference fringes are not formed in the peripheral portion (the edge region) 310p. Here, the central portion (the center region) 310c is also referred to as a first region. Further, the peripheral portion 310p is also referred to as a second region.

The support member SS is in contact with the hologram element 310 from one side (the negative y side) and supports the hologram element 310. The support member SS is constituted by a transparent substrate (a light transmissive substrate) or the like, and transmits visible light such as the imaging light or the external light. Here, it is assumed that the support member SS is constituted by a first substrate member BM1 and a support-side film member BFb provided on the first substrate member BM1. A more specific configuration example of the first substrate member BM1 will be described below with reference to FIG. 4. Here, the support-side film member BFb is also referred to as a second film member.

The support-side film member BFb (the second film member) is a member that forms the outermost layer, of the support member SS, that is in contact with the hologram element 310. The support-side film member BFb supports the hologram element 310, and is also in contact with the covering film member BFa (the first film member) at locations separated from the hologram element 310. Note that the support-side film member BFb may be constituted by the same member as the covering film member BFa.

The covering film member BFa is constituted, for example, by a transparent and adhesive tape-shaped member having a thickness of approximately 25 μm, and is in contact with the hologram element 310 from the opposite side (the positive y side) from the support member SS, to cover the hologram element 310. As illustrated in the state β, when the diffractive optical member 300 is viewed along the XZ plane, it can be understood that the covering film member BFa includes a coupling portion CN that is in contact with the support member SS at a position separated from the hologram element 310. In the case of the illustrated mode, as described above, the outermost layer of the support member SS is formed by the support-side film member BFb, and thus, the covering film member BFa forms the coupling portion CN by contacting the support-side film member BFb. In other words, of the covering film member BFa, a range thereof that is in contact with the support-side film member BFb is formed as the coupling portion CN. Further, in this case, for example, as illustrated in the state S, the coupling portion CN is formed so as to surround the hologram element 310 at an end-side position separated from the hologram element 310. As a result, the hologram element 310 is interposed between the covering film member BFa and the support member SS including the support-side film member BFb, and a sealed state is obtained. In order to secure a desired sealed state, the covering film member BFa and the support-side film member BFb are each constituted by a member having a certain thickness T1 (a thickness of approximately 25 μm, for example). It is considered desirable that the covering film member BFa and the support-side film member BFb be each, for example, a resin tape or the like having a thickness of at least approximately 10 μm or greater as the thickness T1, in order to secure barrier properties with respect to moisture. Here, as an example, sufficient water resistance properties and adhesion may be secured by using, as the covering film member BFa and the support-side film member BFb, Tesa tape (registered trademark), which is a tape-shaped member (a double-sided tape) having a thickness of 25 μm and sufficient transparency (having a light transmittance of 90% or greater, for example). Note that by adopting such a configuration, even if moisture is generated from the adhesive layer (the adhesive member) 340, water infiltration due to the moisture can be avoided or suppressed.

Further, in the above-described mode, the coupling portion CN at the covering film member BFa has a width W of 2 mm or greater, and forms a coupling surface CS that is in contact with the support member SS or the support-side film member BFb. As a result of the coupling surface CS having the width of 2 mm or greater, the above-described sealed state of the coupling portion CN can be reliably maintained.

Further, in the above-described configuration, as a result of the coupling portion CN being formed so as to be separated from the hologram element 310, a gas portion AP is formed between the hologram element 310 and the coupling portion CN. In other words, as illustrated in a partially enlarged manner, due to the coupling at the coupling portion CN, the gas portion AP is formed between the covering film member BFa, the hologram element 310, and the support member SS. In this case, as a result of the hologram element 310 having the thickness T of a certain thickness (a thickness of approximately 80 μm, for example), and the coupling portion CN being sufficiently separated from the hologram element 310, a space of a sufficient size is secured for the gas portion AP. As a result, for example, it becomes possible to avoid a situation such as moisture infiltrating through an interface between the covering film member BFa and the support member SS due to the capillary action. Note that the gas portion AP may be in a state of being filled with an inert gas. For example, when manufacturing the diffractive optical member 300, by performing a sealing operation of the hologram element 310, namely, forming the gas portion AP under a nitrogen gas atmosphere, the above-described mode can be achieved.

Further, on the other hand, for example, as illustrated in the state α, the peripheral portion 310p (the second region) is provided between the coupling portion CN and the central portion 310c (the first region) when viewed from the normal direction of a cross section including the hologram element 310, the support member SS, and the covering film member BFa (the first film member). In this case, as illustrated in the state @, by providing the peripheral portion 310p (the second region) of an appropriate size in the hologram element 310, the gas portion AP can be separated from the central portion 310c (the first region) through which component light contributing to an image passes. In this way, for example, when the diffractive optical member 300 is used as the second diffractive optical member 70, namely, when the diffractive optical member 300 is disposed in front of the eye, by providing the peripheral portion 310p, the gas portion AP can be kept away from a visible range, and see-through performance can be favorably maintained. Describing the above in more detail using other words, in this case, first, the diffractive optical member 300 is disposed in front of the eye of a user (the wearer US in FIG. 1) when used as the second diffractive optical member 70, and in the hologram element 310, the peripheral portion (the edge region) 310p, which does not have a hologram function, is provided further on the outer side of the central portion (the center region) 310c, which is a virtual image display region that has the hologram function and contributes to a virtual image display. Note that the coupling portion CN is formed further on the outer side of the peripheral portion (the edge region) 310p. In this case, by providing the peripheral portion (the edge region) 310p, the gas portion AP, which is formed, for example, as a result of maintaining the state of being separated from the coupling portion CN, can be kept away from the front of the eye of the user (the wearer US in FIG. 1), and the see-through performance can be maintained (secured) in a favorable state.

Further, in the case of the above-described mode, by adopting a configuration in which a section, such as an air layer, is not provided in a section other than the gas portion AP, namely, anywhere between the covering film member BFa and the hologram element 310 and between the support-side film member BFb and the hologram element 310, the favorable see-through performance is secured without causing an unintended refraction effect to arise due to a difference in the refractive index between the air layer and the hologram element 310.

The covering member CC is a member that covers the hologram element 310 from the side opposite to the support member SS (the positive y side), and, as illustrated in the drawing, the covering member CC covers the covering film member BFa. In other words, by covering the covering film member BFa, the covering member CC covers the hologram element 310 as well as the covering film member BFa.

Further, it can also be seen that the covering member CC covers the hologram element 310 and the covering film member BFa in cooperation with the support member SS. Note that the covering member CC is a member that is constituted by a transparent substrate (a light transmissive substrate), or the like and transmits visible light such as the imaging light or the external light. Here, the covering member CC is constituted by a second substrate member BM2. A more specific configuration example of the second substrate member BM2 will be described below with reference to FIG. 4.

The adhesive layer (the adhesive member) 340 is constituted by a material (an adhesive) having transparency, is formed between the support member SS and the covering member CC, and integrates the entire diffractive optical member 300 by adhesively fixing the support member SS and the covering member CC together with the hologram element 310 and the covering film member BFa. Further, when the adhesive layer 340 is formed, in other words, when the adhesive layer 340 is adhered, the adhesive layer 340 absorbs a convex-shaped step generated as a result of layering the members from the support-side film member BFb to the covering film member BFa, and a gap difference between the support member SS and the covering member CC. As a material of the adhesive layer 340, for example, an epoxy resin having a certain degree of water resistance, or the like may be applied. Further, as the above-described material, an ultraviolet curable material may be used to prevent hologram performance from deteriorating as a result of the hologram element 310 being exposed to a high temperature for a long period of time. Note that, as long as a problem in terms of the performance or the like does not arise, in addition to the above-described materials, for example, an acrylic resin, a silicone resin, a polyester resin, a urethane resin, a polyvinyl acetate resin, or the like may also be applied as the material of the adhesive layer 340. Further, for example, a thermosetting resin may also be used as well as the ultraviolet curable resin.

Figure 4:
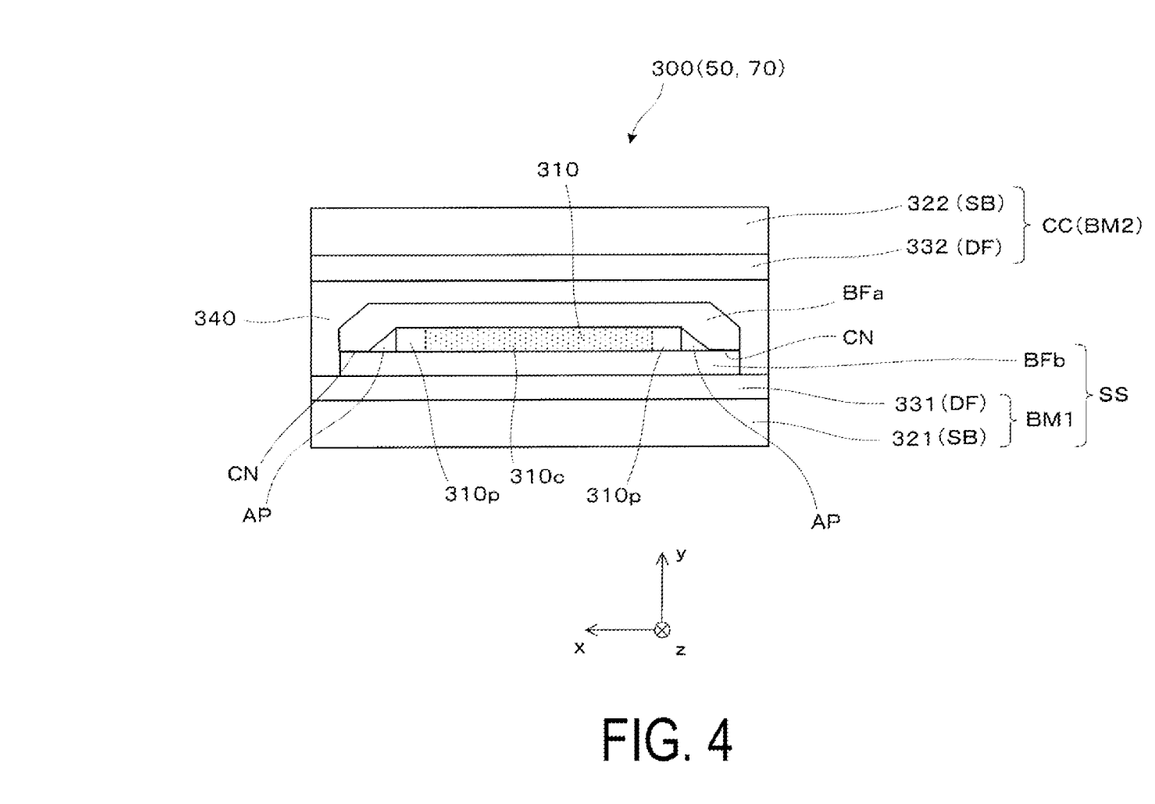
FIG. 4 is a schematic vertical cross-sectional view of an example of the diffractive optical member.

With reference to FIG. 4, as a more specific configuration example of the diffractive optical member 300, an example illustrating the first substrate member BM1 and the second substrate member BM2 will be described below. Note that, in FIG. 4 also, in order to make it easier to understand the structure, the dimensions (the thickness, for example) of each portion are depicted in an exaggerated manner, namely, exaggerating the actual dimensions. In the example illustrated in FIG. 4, the first substrate member BM1 constituting the support member SS is constituted by a substrate SB (a first substrate 321) and a support-side dielectric film 331 (a dielectric film DF) formed on the first substrate 321. The second substrate member BM2 constituting the covering member CC is constituted by a substrate SB (a second substrate 322) and a covering-side dielectric film 332 (a dielectric film DF) formed on the second substrate 322. Thus, as in the example illustrated in the drawing, the support-side film member BFb is provided between the hologram element 310 and the support-side dielectric film 331 when viewed from a cross section including the hologram element 310, the first substrate 321, and the second substrate 322 (the covering film member BFa), namely, from the normal direction of a cross section taken across each of portions that are formed in a layered manner. Further, the adhesive layer (the adhesive member) 340 is provided between the covering film member BFa and the covering-side dielectric film 332 when viewed from the cross section including the hologram element 310, the first substrate 321, and the second substrate 322 (the covering film member BFa), namely, from the normal direction of the cross section taken across each of the portions that are formed in the layered manner. Here, the support-side dielectric film 331 (the dielectric film DF) is also referred to as a first dielectric film. Further, the covering-side dielectric film 332 (the dielectric film DF) is also referred to as a second dielectric film.

Here, when the diffractive optical member 300 has the above-described configuration, in order to protect the hologram element 310, in addition to the above-described water resistance of the covering film member BFa and the support-side film member BFb, and the like, adhesion (bonding) of the covering film member BFa and the support-side film member BFb with other members needs to be sufficiently enhanced. More specifically, it is necessary to secure adhesion of the first substrate member BM1 with the support-side film member BFb, and adhesion of the first substrate member BM1 and the second substrate member BM2 with the adhesive layer 340. Thus, in the above-described example, by providing the dielectric films DF, which are inorganic material films, namely, the support-side dielectric film 331 (the first dielectric film) and the covering-side dielectric film 332 (the second dielectric film) as the outermost layers, of the first substrate member BM1 and the second substrate member BM2, which are in contact with other members, even if a material that does not secure sufficient adhesion is used for each of the substrates SB, namely, the first substrate 321 and the second substrate 322, necessary adhesion is secured when manufacturing the diffractive optical member 300.

Each of the substrates SB, namely, the first substrate 321 and the second substrate 322 are transparent substrates made of resin that transmit visible light such as the imaging light or the external light. As a constituent material of the first substrate 321 and the second substrate 322, for example, a resin material such as polyethylene terephthalate, polyethylene naphthalate, polypropylene, cycloolefin polymer, polyamide, polyether sulfone, polymethyl methacrylate, polycarbonate, and polyalylate, and a glass material such as quartz glass and soda glass may be applied. One, two or more types of those materials can be used in combination. An average thickness of the first substrate 321 and the second substrate 322 described above is not particularly limited, but it is preferably set to be approximately from 0.5 mm to 5 mm, and more preferably to be approximately from 0.7 mm to 2 mm.

Each of the dielectric films DF, namely, the support-side dielectric film 331 and the covering-side dielectric film 332 are formed, for example, by forming, as a film, alumina (Al$_2$O$_3$) having a thickness of approximately 60 nm on the substrate SB. In this case, the support-side dielectric film 331 forms the outermost layer of the first substrate member BM1, and the covering-side dielectric film 332 forms the outermost layer of the second substrate member BM2. Thus, the supporting-side dielectric film 331 is a surface-forming film that forms an interface by contacting the adhesive layer (the adhesive member) 340 and the support-side film member BFb, and the covering-side dielectric film 332 is a surface-forming film that forms an interface by contacting the adhesive layer (the adhesive member) 340. The support-side dielectric film 331 and the covering-side dielectric film 332 that are constituted by the above-described material, or the like have appropriate adhesion with respect to the first substrate member BM1 and the second substrate member BM2, and to the adhesive layer 340.

Further, the constituent material of each of the dielectric films DF, namely, of the support-side dielectric film 331 and the covering-side dielectric film 332 is not limited to the examples described above, but may be any one of various materials having various thicknesses, as long as the material is dielectric and satisfies various requirements such as being able to impart water resistance (water vapor barrier properties) and transparency to the support-side dielectric film 331, and the like. Specifically, an inorganic material such as a ceramic material and a glass material, a resin material, or the like may be applied, for example. As the ceramic material, for example, alumina, zirconia, magnesia, silica, silicon monoxide, titania, hafnium oxide, aluminum nitride, silicon nitride, silicon carbide, barium titanate, or the like can be applied, and one, two or more types of those materials may be used in combination. Of those materials, it is preferable to apply silicon monoxide (SiO), silica (SiO$_2$), hafnium oxide (HfO$_2$), zirconia (ZrO$_2$), or titania (TiO$_2$). Further, when the ceramic material is used, the support-side dielectric film 331 and the covering-side dielectric film 332 can be relatively easily formed by a vacuum evaporation method, sputtering, ion plating, or a vapor growth method such as a plasma chemical vapor growth method. Note that, as the glass material, for example, quartz glass, borosilicate glass, or the like can be applied. Further, as the resin material, for example, polyvinyl chloride, polyethylene, polypropylene, polytetrafluoroethylene, polyethylene terephthalate, polyvinyl fluoride, an epoxy resin, a phenol resin, or the like can be applied. Note that the support-side dielectric film 331 and the covering-side dielectric film 332 may each be either a single layer body or a multi-layer body constituted by the above-described constituent material or materials, but the support-side dielectric film 331 and the covering-side dielectric film 332 are preferably the multi-layer bodies. When the multi-layer body is used, the support-side dielectric film first 331, or the like can be provided with a layer constituted by silicon monoxide (SiO) and a layer constituted by alumina (Al$_2$O$_3$) with the silicon monoxide (SiO) layer disposed on the first substrate 321 side, or can be provided with the layer constituted by silicon monoxide (SiO) and a layer constituted by hafnium oxide (HfO$_2$) with the silicon monoxide (SiO) layer disposed on the first substrate 321 side. An average thickness of the support-side dielectric film 331 and the covering-side dielectric film 332 is not particularly limited, but it is preferably set to be approximately from 50 nm to 1 μm, and more preferably to be approximately from 100 nm to 300 nm in order to maintain sufficient water vapor barrier properties and to avoid the occurrence of film cracking.

Note that an example of a manufacturing process of the diffractive optical member 300 can be described as below. First, the first substrate member BM1 and the second substrate member BM2 having the above-described configuration are produced, and further, the support-side film member BFb is provided, for example, as a result of being affixed onto the first substrate member BM1 by a tape member. As a result, the support member SS and the covering member CC (the second substrate member BM2) are prepared. Subsequently, the hologram element 310 is installed on the support member SS, namely, on the support-side film member BFb, and also, the hologram element 310 is covered by the covering film member BFa constituted by a tape member or the like. As a result, the hologram element 310 is sealed (airtightly closed) by the covering film member BFa and the support-side film member BFb. Note that, at this time, the gas portion AP and the coupling portion CN (the coupling surface CS) are also formed. Finally, an adhesive that forms the adhesive layer 340 is applied onto the covering film member BFa, and this is covered by the covering member CC. Then, as a result of the adhesive being solidified by the irradiation of ultraviolet light, or the like, the diffractive optical member 300 is manufactured.

Figure 5:
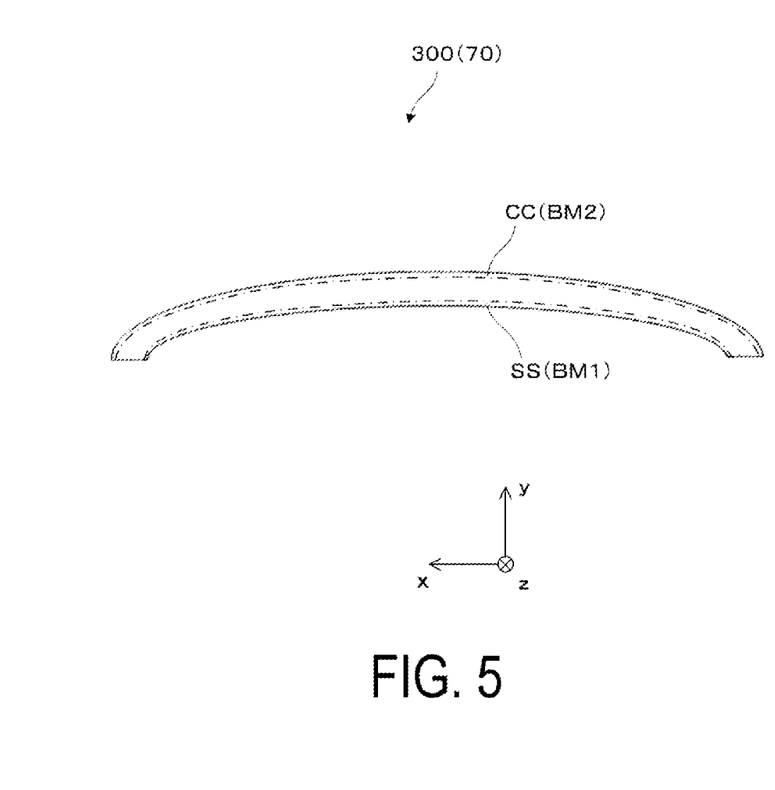
FIG. 5 is a schematic vertical cross-sectional view of the diffractive optical member according to a modified example.

Further, as already described above, or as in a modified example schematically illustrated in a vertical cross-sectional view of FIG. 5, the configuration of the diffractive optical member 300 can also be applied to a curved surface shape such as a spectacle lens. In other words, the diffractive optical member 300 can be applied to the second diffractive optical member 70 illustrated in FIG. 2, and the like.

As described above, the diffractive optical member 300 according to this embodiment includes the hologram element 310, the support member SS that supports the hologram element 310 from the one side, and the covering film member BFa that is the first film member and covers the hologram element 310 by contacting the hologram element 310 from the side opposite to the one side. The covering film member BFa includes the coupling portion CN that is in contact with the support member SS, and the coupling portion CN is separated from the hologram element 310. In the above-described diffractive optical member 300, by sealing (airtightly closing) the hologram element 310 by the support member SS that is in contact with the hologram element 310 from the one side, and the covering film member BFa that is in contact with the hologram element 310 from the side opposite to the one side, the infiltration of moisture into the hologram element 310 is suppressed or prevented. At this time, the covering film member BFa is configured to include the coupling portion CN that is separated from the hologram element 310 and is in contact with the support member SS. As a result, for example, at the coupling portion CN, in other words, at the section (interface) at which the covering film member BFa is in contact with the support member SS, it is possible to avoid or suppress the infiltration of moisture into the hologram element 310 due to the capillary action, or the like. Thus, when the diffractive optical member 300 is applied to the HMD 200, which is, for example, a virtual image display device, favorable image formation can be achieved in the HMD 200.

Second Embodiment

Figure 6:
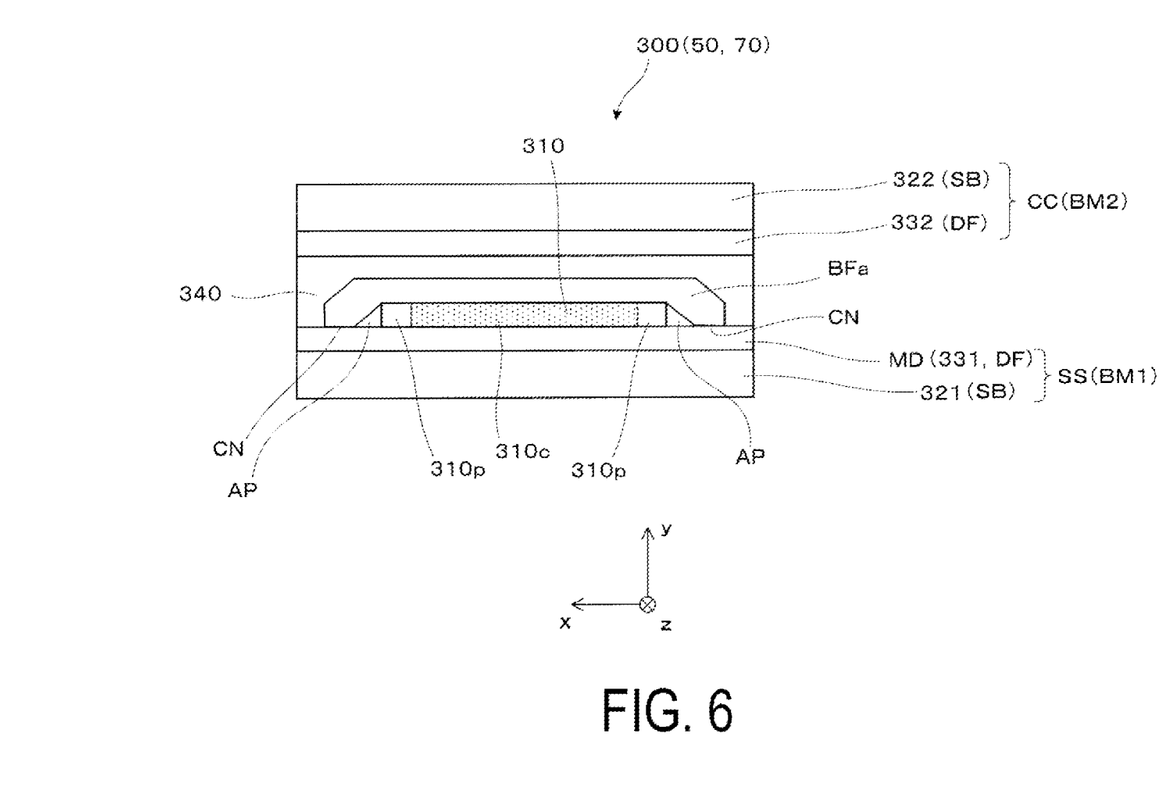
FIG. 6 is a schematic vertical cross-sectional view of the diffractive optical member according to a second embodiment.

With reference to FIG. 6, an example of the diffractive optical member according to a second embodiment will be described below. In this embodiment, except for the configuration of the support member SS, the configuration of the diffractive optical member 300 is the same as that of the first embodiment, and the diffractive optical member 300 can also similarly be applied to the virtual image display device. Thus, the same reference signs as those of the first embodiment will be applied, and the matters described in the first embodiment will be referenced as necessary. Note that FIG. 6 is a vertical cross-sectional view corresponding to FIG. 4.

The diffractive optical member 300 according to this embodiment is different from that of the first embodiment in that the support member SS is constituted by the first substrate member BM1, and the support member SS does not include the support-side film member BFb (see FIG. 4). In other words, in this embodiment, the outermost layer of the first substrate member BM1 is in contact with the hologram element 310, the adhesive layer 340, and, further, the covering film member BFa. Here, the support-side dielectric film 331 (the first dielectric film), which is the outermost layer of the first substrate member BM1, is a dielectric film MD that is the outermost layer, of the support member SS, that is in contact with the hologram element 310. In this case, the covering film member BFa forms the coupling portion CN by contacting the support-side dielectric film 331, which is the first dielectric film.

In this case, it is necessary to secure adhesion between the support-side dielectric film 331 and the covering film member BFa. In this embodiment, for example, in the same manner as when securing the adhesion between the support-side dielectric film 311 and the support-side film member BFb (see FIG. 4) in the first embodiment, by selecting the material, and the like, the necessary adhesion can be secured between the support-side dielectric film 331, which is the outermost layer, and the covering film member BFa.

In this embodiment also, by sealing (airtightly closing) the hologram element 310 by the support-side dielectric film 331 and the covering film member BFa, the infiltration of moisture into the hologram element 310 is suppressed or prevented. At this time, as a result of the covering film member BFa including the coupling portion CN that is separated from the hologram element 310 and in contact with the support-side dielectric film 331, it becomes possible to avoid or suppress the infiltration of moisture into the hologram element 310 due to the capillary action, or the like. Thus, when the diffractive optical member 300 is applied, for example, to the virtual image display device, the favorable image formation can be achieved.

Third Embodiment

Figure 7:
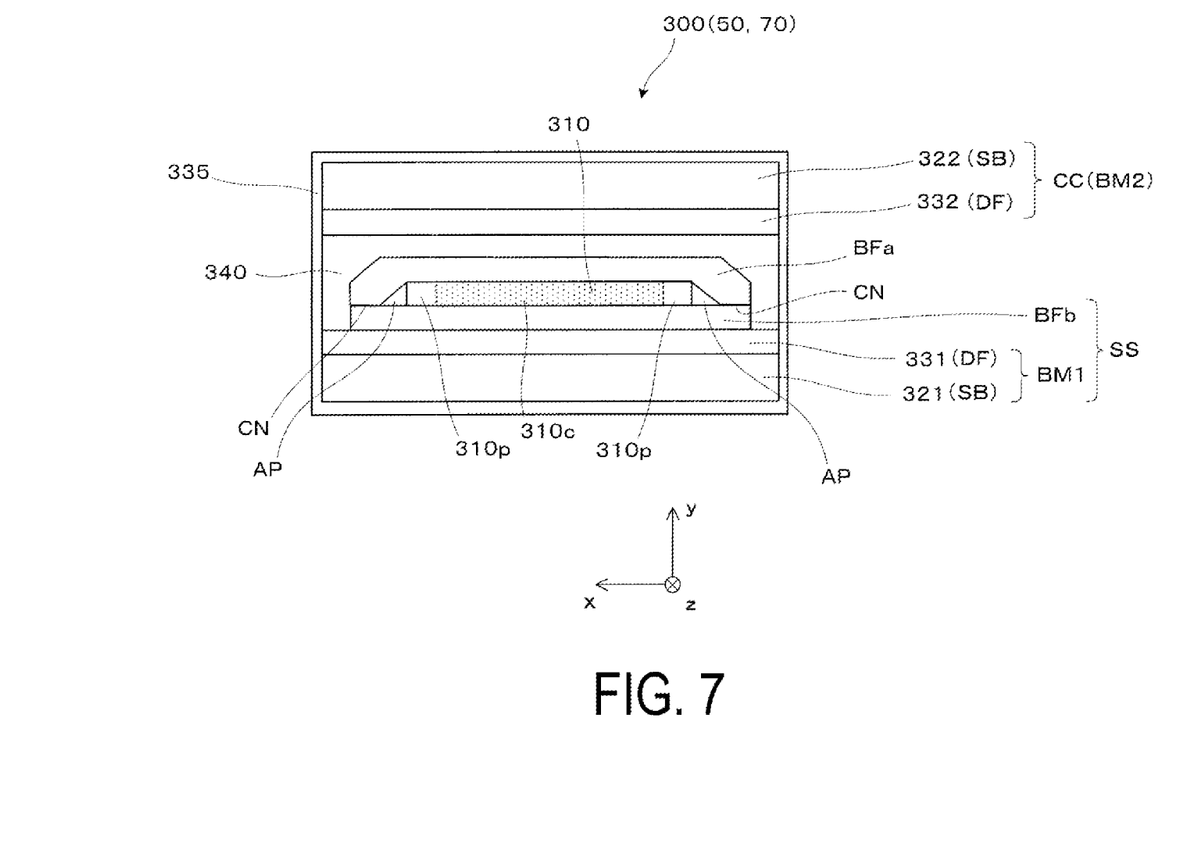
FIG. 7 is a schematic vertical cross-sectional view of the diffractive optical member according to a third embodiment.

With reference to FIG. 7, an example of the diffractive optical member according to a third embodiment will be described below. In this embodiment, the diffractive optical member 300 is different from that of the above-described embodiments in that an outer surface dielectric film 335 is provided on the outer surfaces of the adhesive layer (adhesive member) 340, the support member SS, and the covering member CC, namely, on the outer surfaces of the adhesive layer 340, the first substrate 321, and the second substrate 322, but otherwise, the configuration of the diffractive optical member 300 is the same as that of the first embodiment, and the like. Also, the diffractive optical member 300 can similarly be applied to the virtual image display device. Thus, the same reference signs as those of the first embodiment will be applied, and the matters described in the first embodiment will be referenced as necessary. Note that FIG. 7 is a vertical cross-sectional view corresponding to FIG. 4, and the like. Here, the outer surface dielectric film 335 is also referred to as a third dielectric film.

The diffractive optical member 300 according to this embodiment is different from those of the first embodiment, and the like in that the outer surface dielectric film 335 (the third dielectric film) is provided on the outer surfaces of the first substrate 321 and the second substrate 322. In particular, in the illustrated example, not only the first substrate 321 and the second substrate 322, but the entire layered body interposed between the first substrate 321 and the second substrate 322 is covered by the outer surface dielectric film 335.

For example, similarly to the covering film member BFa, the dielectric film DF, and the like, any one of various materials having optical transparency and water resistance (barrier) properties may be employed as the outer surface dielectric film 335. In other words, a tape-shaped member, any one of various inorganic materials, or the like may be used as the outer surface dielectric film 335. However, in the manufacturing process of the diffractive optical member 300, it is assumed that attachment of the outer surface dielectric film 335 is carried out in a process subsequent to a process of interposing the hologram element 310 between the support member SS and the covering member CC, and the like. Thus, at the time of manufacturing, a request may be made to avoid exposure of the hologram element 310 to a high temperature for a long period of time in order to prevent degradation of the hologram element 310, for example. Thus, it is conceivable to apply, as the outer surface dielectric film 335, a film formed or bonded together, for example, using a method shown in Table 1 below. Note that in the example illustrated in FIG. 7, a configuration is illustrated in which the outer surface dielectric film 335 is applied to the configuration example illustrated in FIG. 4, but the configuration is not limited to this example. For example, the outer surface dielectric film 335 can also be applied to the configuration example illustrated in FIG. 5.

TABLE 1

| Film Formation Method | Film Type | Process Temperature |
|---|---|---|
| Vapor Deposition | $SiO_2$, $TiO_2$ | 40 to 100° C. |
| PCS | SiON | 60 to 100° C. |
| ALD | $Al_2O_3$, HfO | 85° C. |

| Bonding Method | Film Type | UV Light or Process Temperature |
|---|---|---|
| Epoxy | Epoxy | UV Light, Up to 100° C. |
| Coating Material | Acrylic | UV Light |
| OCA | Tesa Tape | Room Temperature |
| OCA | LUCIACS | Room Temperature |
| OCA | LIMTEC Film | Room Temperature |

Further, in addition, a function as an anti-reflective film (an AR coat) may be imparted to the outer surface dielectric film 335. From a different perspective, it can be said that a water resistance (water vapor barrier) function may be imparted to the anti-reflective film.

In this embodiment also, by sealing (airtightly closing) the hologram element 310 by the support member SS and the covering film member BFa, the infiltration of moisture into the hologram element 310 is suppressed or prevented. At this time, as a result of the covering film member BFa including the coupling portion CN that is separated from the hologram element 310 and is in contact with the support member SS, it becomes possible to avoid or suppress the infiltration of moisture into the hologram element 310 due to the capillary action, or the like. Thus, when the diffractive optical member 300 is applied, for example, to the virtual image display device, the favorable image formation can be achieved. Further, when this embodiment is adopted, due to the outer surface dielectric film 335, the infiltration of moisture into the interior of the diffractive optical member 300 can be further suppressed.

Modified Examples and Other Matters

The above-described specific structures of the diffractive optical member 300, the display device 100 to which the diffractive optical member 300 is applied, and the HMD 200 are merely illustrated as examples, and various changes can be made thereto within a range in which the same functions can be achieved.

Figure 8:
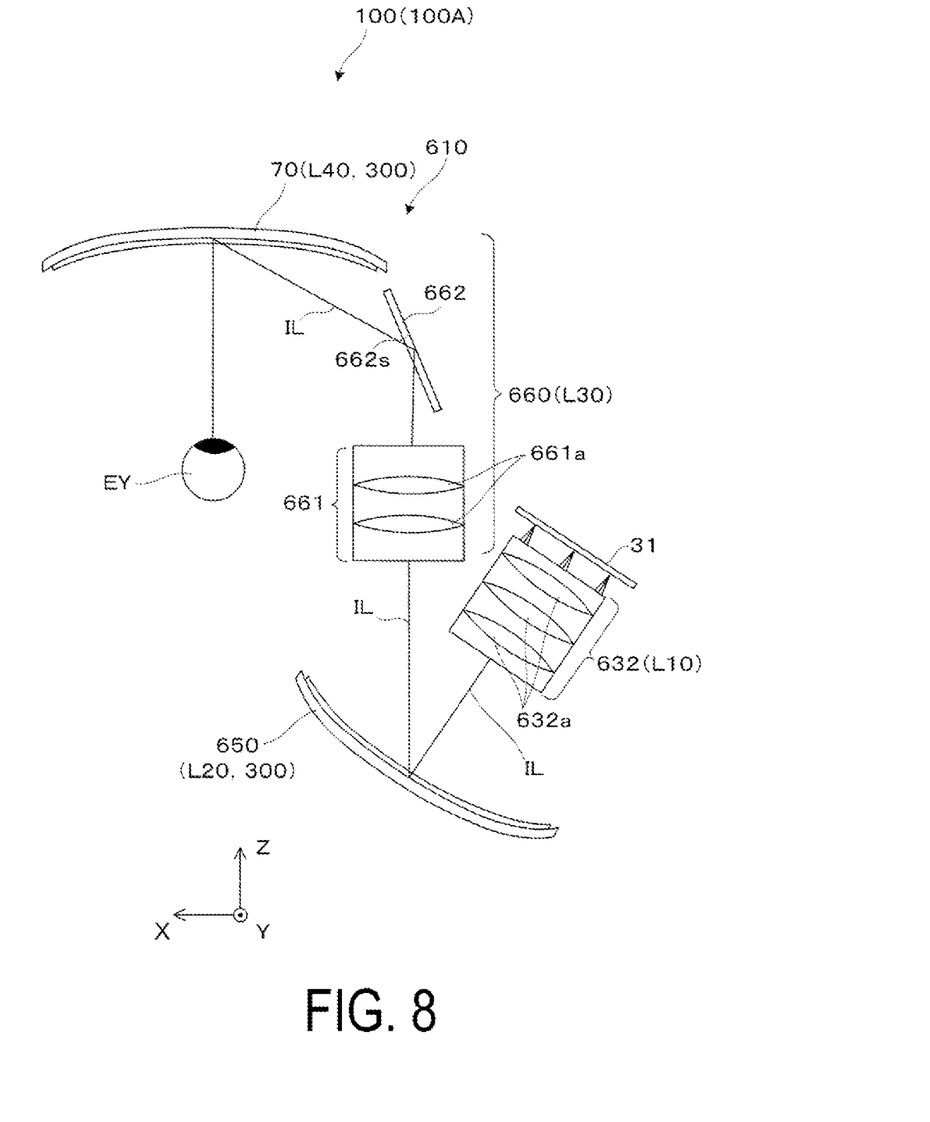
FIG. 8 is a ray diagram of an optical system of another example of the head-mounted display.

FIG. 8 is a ray diagram of an optical system of another example of the HMD, and is a diagram corresponding to FIG. 2. In the same manner as in the optical system 10 illustrated as the example in FIG. 2, in addition to the imaging light generating device 31, an optical system 610 illustrated in FIG. 8 is provided with the first optical unit L10 having the positive power, the second optical unit L20 having the positive power, the third optical unit L30 having the positive power, and the fourth optical unit L40 having the positive power. The first optical unit L10 is constituted by a projection optical system 632, the second optical unit L20 is constituted by a first diffractive optical member 650, which is a reflection-type diffractive element, the third optical unit L30 is constituted by a light guiding system 660, and the fourth optical unit L40 is constituted by a second diffractive optical member 670, which is a reflection-type diffractive element. Note that light incident surfaces of the first diffractive optical member 650 and the second diffractive optical member 670 each have a shape in which a central portion thereof is recessed and curved with respect to a peripheral portion thereof, and thus, light can be efficiently deflected toward the light guide system 660.

The projection optical system 632 is an optical system configured to project the imaging light IL generated by the imaging light generation device 31, and is constituted by a plurality of lenses 632a. Note that, in the example illustrated in FIG. 8, the projection optical system 632 includes three of the lenses 632a, but the number of lenses 632a is not limited to this example. The projection optical system 632 may include four or more of the lenses 632a. Further, each of the lenses 632a may be bonded together to constitute the projection optical system 632. Further, the lens 632a may be constituted by a lens having a free form surface.

The light-guiding optical system 660 includes a lens system 661 on which the imaging light IL emitted from the first diffractive element 650 is incident, and a mirror 662 that emits the imaging light IL emitted from the lens system 661 in a diagonally inclined direction. The lens system 661 is constituted by a plurality of lenses 661a. The mirror 662 includes a reflective surface 662a inclined obliquely in the front-rear direction. The mirror 662 may be a total reflection mirror, but the mirror 662 may also be a half mirror in order to expand a range in which the external light is visible.

In the above-described configuration also, by using the diffractive optical member 300 having the above-described structure as the first diffractive optical member 650 or the second diffractive optical member 670, the favorable image formation can be achieved.

Further, although a detailed illustration is omitted, as an optical system of another example of the HMD configured by partially changing the optical system exemplified in FIG. 2 or FIG. 8, a configuration is conceivable in which the imaging light generating device 31, a scanning mirror, and the diffractive optical member 300 are provided. In this case, the imaging light generating device 31 generates laser light obtained by combining each of laser light output from a red laser light source, laser light output from a blue laser light source, and laser light output from a green laser light source. Then, by appropriately modulating the output from each of the laser light sources of each of the colors, laser light of a chosen color is output. Further, by performing the modulation in conjunction with the scanning mirror and the like to be described below, an image can be displayed on the retina of the eye of the user.

The scanning mirror is configured to reflect the laser light emitted from the imaging light generating device 31 to the diffractive optical member 300. Further, the scanning mirror includes a mirror and an oscillation control unit that controls oscillation of the mirror at a certain frequency. The oscillation control unit is constituted, for example, by a MEMS. By constituting the oscillation control unit by the MEMS in this manner, downsizing of the scanning mirror is realized.

The diffractive optical member 300 is a member that displays an image on the retina of the eye of the user by deflecting (reflecting) the light emitted from the imaging light generating device 31 via the scanning mirror. By adopting such a configuration, the structure of the optical system of the HMD can be simplified.

Further, in each of the above-described embodiments, various combinations are possible. For example, when a plurality of the diffractive optical members are provided in the HMD, the diffractive optical members having different configurations may be used in combination.

Further, in the display device 100 and the like illustrated in FIG. 1, the imaging light IL is guided using the horizontal direction (a direction parallel to the XZ plane) as a main direction, but the configuration is not limited to this example. For example, this embodiment can be applied to a case in which the imaging light IL is guided using the vertical direction (a direction parallel to the YZ plane) as the main direction.

Further, for example, in each of the above-described embodiments, the display device 100 is incorporated into the HMD 200, but the display device 100 can be incorporated into a head-up display.

Furthermore, the diffractive optical member 300 illustrated in each of the above-described embodiments may be applied to various optical components or products, which use a diffractive optical member, other than the HMD and the like.

Further, the display device 100 or the HMD 200 is not limited to the see-through type that can observe the external image, and the diffractive optical member 300 can be applied to a closed type HMD that blocks the external image. In this case, for example, of the support member SS and the covering member CC illustrated in FIG. 3 and the like, the substrate through which the imaging light IL does not pass may be constituted by a non-transmissive (opaque) material.

As described above, a diffractive optical member according to a specific aspect includes a hologram element, a support member configured to support the hologram element by contacting the hologram element from one side, and a first film member configured to cover the hologram element by contacting the hologram element from a side opposite to the one side. The first film member includes a coupling portion in contact with the support member, and the coupling portion is separated from the hologram element.

In the diffractive optical member, by sealing (airtightly closing) the hologram element by the support member in contact with the hologram element from the one side and by the first film member in contact with the hologram element from the opposite side, infiltration of moisture into the hologram element is suppressed or prevented. At this time, the covering film member is configured to include the coupling portion that is separated from the hologram element and is in contact with the support member. As a result, for example, at the coupling portion, in other words, at a section (an interface) at which the first film member is in contact with the support member, it is possible to avoid or suppress the infiltration of moisture into the hologram element due to a capillary action, or the like. Thus, when the diffractive optical member is applied to a virtual image display device, for example, favorable image formation can be achieved.

In a specific aspect, the support member includes a first dielectric film in contact with the hologram element, and the first film member forms the coupling portion by contacting the first dielectric film. In this case, by the first film member and the first dielectric film, the hologram element can be sealed (airtightly closed) while maintaining a state of being separated from the coupling portion.

In another aspect, the support member includes a second film member in contact with the hologram element, and the first film member forms the coupling portion by contacting the second film member. In this case, by the first film member and the second film member, the hologram element can be sealed (airtightly closed) while maintaining the state of being separated from the coupling portion.

In yet another aspect, the support member includes a first dielectric film formed on a substrate, and the second film member is provided between the hologram element and the first dielectric film when viewed from a normal direction of a cross section including the hologram element, the support member, and the first film member. In this case, while securing adhesion between the second film member and the hologram element, and adhesion between the second film member and the first dielectric film, the infiltration of moisture into the hologram element can be avoided or suppressed.

In yet another aspect, an inert gas is filled in a gas portion formed between the first film member, the hologram element, and the support member as a result of coupling at the coupling portion. In this case, it is possible to avoid or suppress generation of moisture in the gas portion due to an unexpected reaction, for example.

In yet another aspect, the diffractive optical member includes a covering member configured to cover the first film member as well as the hologram element. In this case, the first film member can be protected by the covering member, and consequently, the hologram element can be protected.

In yet another aspect, the diffractive optical member includes an adhesive member configured to adhere the support member, the first film member, and the covering member. In this case, each of the portions can be adhesively fixed by the adhesive member. Further, in this case, a convex-shaped step or a gap difference generated as a result of layering each of the portions can be absorbed by the adhesive member.

In yet another aspect, the covering member includes a second dielectric film in contact with the adhesive member, and the adhesive member is provided between the first film member and the second dielectric film when viewed from a normal direction of a cross section including the hologram element, the support member, and the first film member. In this case, the first film member and the covering member can be adhesively fixed to each other in a reliable manner.

In yet another aspect, the dielectric optical member includes a third dielectric film in contact with the adhesive member and configured to cover the support member and the covering member. In this case, the third dielectric film can further suppress or prevent the infiltration of moisture into the hologram element.

In yet another aspect, the first film member is a resin tape having a thickness of 10 μm or greater. In this case, for example, when manufacturing the diffractive optical member, easy and reliable attachment of the first film member can be achieved that has sufficient water resistance properties, and the like and is configured to have desired shapes at desired positions.

In yet another aspect, the first film member is an optically transparent tape. In this case, the diffractive optical member can be applied to a virtual image display device for which see-through performance is required.

In yet another aspect, the coupling portion has a width of 2 mm or greater and forms a coupling surface in contact with the support member. In this case, it is possible to reliably maintain the sealed state at the coupling portion.

As described above, a virtual image display device according to a specific aspect includes any one of the diffractive optical members described above. In this case, by using the diffractive optical member described above, the infiltration of moisture into the hologram element applied to the image formation can be avoided or suppressed, and the favorable image formation can be achieved.

In the specific aspect, the diffractive optical member is disposed in front of an eye of a user when used, the hologram element includes a first region including interference fringes, and a second region not including the interference fringes, and the second region is provided between the coupling portion and the first region when viewed from a normal direction of a cross section including the hologram element, the support member, and the first film member. In this case, by providing the second region, the gas portion that is formed as a result of maintaining the state separated from the coupling portion can be kept away from the front of the eye of the user, and the see-through performance can be maintained (secured) in a favorable state.

What is claimed is:

1. A diffractive optical member comprising:
   a hologram element;
   a support member that supports the hologram element by contacting the hologram element from one side; and
   a first film member that covers the hologram element by contacting the hologram element from a side opposite to the one side, wherein
   the first film member includes a coupling portion in contact with the support member,
   the coupling portion is separated from the hologram element, and
   an inert gas is filled in a gas portion formed between the first film member, the hologram element, and the support member as a result of coupling at the coupling portion.

2. The diffractive optical member according to claim 1, wherein
   the support member includes a first dielectric film in contact with the hologram element, and
   the first film member forms the coupling portion by contacting the first dielectric film.

3. The diffractive optical member according to claim 1, wherein
   the support member includes a second film member in contact with the hologram element, and
   the first film member forms the coupling portion by contacting the second film member.

4. The diffractive optical member according to claim 3, wherein
   the support member includes a first dielectric film formed at a substrate, and
   the second film member is provided between the hologram element and the first dielectric film when viewed from a normal direction of a cross section including the hologram element, the support member, and the first film member.

5. The diffractive optical member according to claim 1, comprising
   a covering member that covers the first film member as well as the hologram element.

6. The diffractive optical member according to claim 5, comprising an adhesive member that adheres the support member, the first film member, and the covering member.

7. The diffractive optical member according to claim 6, wherein
   the covering member includes a second dielectric film in contact with the adhesive member, and
   the adhesive member is provided between the first film member and the second dielectric film when viewed from a normal direction of a cross section including the hologram element, the support member, and the first film member.

8. The diffractive optical member according to claim 6, comprising:
   a third dielectric film in contact with the adhesive member and that covers the support member and the covering member.

9. The diffractive optical member according to claim 1, wherein
   the first film member is a resin tape having a thickness of 10 μm or greater.

10. The diffractive optical member according to claim 1, wherein
    the first film member is an optically transparent tape.

11. The diffractive optical member according to claim 1, wherein
    the coupling portion has a width of 2 mm or greater and forms a coupling surface in contact with the support member.

12. A virtual image display device comprising:
    the diffractive optical member according to claim 1.

13. The virtual image display device according to claim 12, wherein
    the diffractive optical member is disposed in front of an eye of a user when used,
    the hologram element includes a first region including interference fringes, and a second region not including the interference fringes, and
    the second region is provided between the coupling portion and the first region when viewed from a normal direction of a cross section including the hologram element, the support member, and the first film member.

14. A virtual image display device comprising:
    a diffractive optical member that includes:
       a hologram element;
       a support member that supports the hologram element by contacting the hologram element from one side; and
       a first film member that covers the hologram element by contacting the hologram element from a side opposite to the one side, wherein
    the first film member includes a coupling portion in contact with the support member,
    the coupling portion is separated from the hologram element,
    the diffractive optical member is disposed in front of an eye of a user when used,
    the hologram element includes a first region including interference fringes, and a second region not including the interference fringes, and
    the second region is provided between the coupling portion and the first region when viewed from a normal direction of a cross section including the hologram element, the support member, and the first film member.

* * * * *